June 9, 1953          H. S. MOORE          2,641,081
LURE WITH IMPROVED WEED GUARD
Filed Nov. 14, 1950
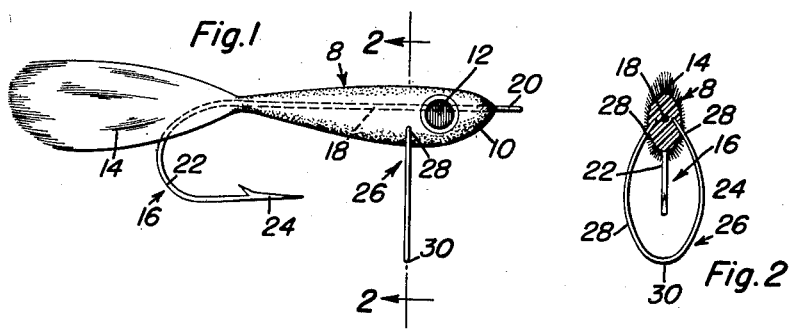
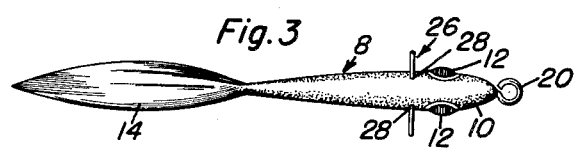
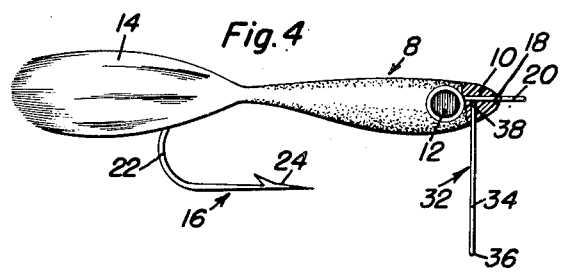
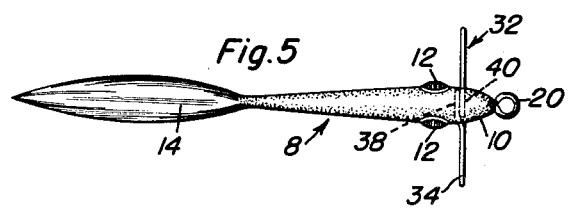
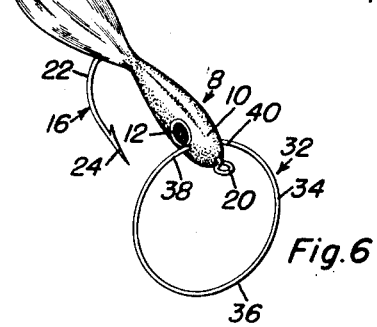
Inventor
Henry S. Moore
By Clarence A. O'Brien
and Harvey B. Jacobson
Attorneys Patented June 9, 1953

2,641,081

UNITED STATES PATENT OFFICE 2,641,081

LURE WITH IMPROVED WEED GUARD

Henry S. Moore, Clarksdale, Miss., assignor of one-half to Francis M. Boone, Clarksdale, Miss.

Application November 14, 1950, Serial No. 195,517

2 Claims. (Cl. 43—42.42)

The present invention relates to certain new and useful improvements in fishing lures such as so-called bugs, flies and analogous artificial creatures, and has more particular reference to a highly practical, simple, and feasible weed guard.

More specifically, the invention appertains to an artificial bait or lure wherein the creature represented may be of any suitable design and style. The creature includes a body portion and a rigid-type fishing hook. The shank of the hook is embedded and extends longitudinally and axially through the buoyant body and has a line attaching eye at the forward or head end of the body. The return bend of the hook underlies the ventral portion of the body and terminates in a barbed hook. The weed guard is a simple flexibly resilient loop, a loop of shape sustaining form and which is limber in nature so that it will flex if and when it comes in contact with weeds or other obstructions. It will swing toward the bill of the hook, keep the same free of entangling weeds and will not interfere with the bait on the hook.

In carrying out the preferred embodiment of the invention, the weed loop is preferably made from a length of nylon the latter being of a gauge which allows the loop to yield and flex yet resume its given shape.

Other objects and advantages will become more readily apparent from the following description and the accompanying sheet of illustrative drawings.

In the accompanying sheet of drawings wherein like numerals are employed to designate like parts throughout the views:

Figure 1 is a side elevational view of a lure constructed in accordance with the principles of this invention and showing the same provided with the novel and improved weed guard;

Figure 2 is a vertical cross section on the line 2—2 of Figure 1, looking in the direction of the arrows;

Figure 3 is a top plan view of the construction illustrated in Figures 1 and 2, respectively;

Figure 4 is a side elevational view showing a weed guard of modified shape;

Figure 5 is a top plan view of the lure depicted in Figure 4;

Figure 6 is a perspective view of the lures shown in Figures 4 and 5, respectively.

The lure or artificial bait appearing in all of the figures is the same in construction and, therefore, the same numerals are employed in all six figures to identify like or corresponding parts.

To this end, the lure represents any suitable creature or so-called bug. The body portion of same is denoted by the numeral 8. The body is provided with a head 10 with side eyes 12. An appropriate hackle or tail 14 is provided on the trailing or rear end of the body. The fish hook is conventional and is denoted by the numeral 16 and has a linearly straight shank portion 18 embedded in the body and extending axially through the body and terminating at its forward end in a line-attaching eye 20. The return bend 22 underlies the rear or tail end portion and is provided with the usual barbed hook 24 which underlies the belly or ventral portion of the body.

The weed guard in Figures 1 to 3, inclusive, is denoted by the numeral 26. It comprises a substantially oval-shaped loop 28 as best shown in Figure 2. The loop is formed from a relatively short length of flexibly resilient nylon, for example, the gauge and grade commonly employed in making fishing line leaders. The end portions 28 (see Figure 2) are embedded and glued or otherwise rigidly anchored in the buoyant body. The bight or central portion 30 depends and is directly beneath the center of the body as best shown in Fig. 2. The loop is of a length so that the bight portion is usually on a plane below the plane of the barbed bill portion 24. The grade of nylon employed is such that the loop provides a flexibly resilient weed guard which hangs down at approximate right angles from the body. The path of swing of the bight portion is such that it will not come into objectionable engagement or contact to the bill portion 24 of the hook. The loop is not flexible in the sense that that would be the case if employing a piece of cord, but is semi-rigid or limber in character. Therefore, it is self-sustaining as far as the shape is concerned and occupies the normal angular position shown and flexes forwardly, backwardly or slightly to the side, depending on the objects with which it comes into contact.

The weed guard in Figures 4 to 6, inclusive, is denoted by the numeral 32 and is of general duplicate form. It comprises a circular loop or ring 34 of nylon whose bight portion is denoted at 36 and whose end portions 38 and 40 overlap and are embedded and glued or otherwise anchored in the body as best shown in dotted lines in Figure 5.

The loop-shaped weed guard in all figures in the drawings has a normal given shape and angular position in respect to the underneath side of the body. In both instances the ends are anchored and embedded in the forward portion of the body rearwardly of the line attaching eye.

It is believed that a lure constructed in accordance with the principles of this invention constitutes an improved article of manufacture in which manufacturers and users will find their essential requirements fully met, contained and satisfactorily available.

It is thought that persons skilled in the art to which the invention relates will be able to obtain a clear understanding of the invention after considering the description in connection with the drawings. Therefore, a more lengthy description is regarded as unnecessary.

Minor changes in the shape, size, materials and arrangement of parts may be resorted to in actual practice without departing from the spirit and scope of the invention, as claimed.

Having described the invention, what is claimed as new is:

1. A fishing lure comprising a buoyant body shaped to represent a predetermined creature, a fishhook having a shank embedded in said body and a barbed bill portion spaced rearwardly, from and facing the forward end of said body, underlying the ventral portion of the body and situated adjacent to the trailing end of said body, and a single weed guard attached at its upper end to the forward end portion of said body and having its major portion depending below said ventral portion, said weed guard being in the form of a circular loop of a diameter appreciably greater than the cross-section of said body, said loop being at an approximate right angle to the longitudinal axis of said body when at rest, being constructed of small gage flexibly resilient material and being spaced a predetermined distance from the barbed bill portion of said hook that it may be flexed rearwardly toward said ventral portion as well as toward said bill portion, said bill portion being in a plane which is in spaced parallelism with the axis of said body, a plane which is below the approximate axial center of said loop when the latter is at rest.

2. The structure specified in claim 1 wherein said weed guard is a relatively short length of flexibly resilient nylon of a gauge commonly employed in the construction of fishing line leaders, said length of nylon being bent upon itself between its ends and defining said circular loop, the ends of the nylon being embedded and thus anchored in said body.

HENRY S. MOORE.

References Cited in the file of this patent
UNITED STATES PATENTS

| Number | Name | Date |
|---|---|---|
| 668,066 | Strong | Feb. 12, 1901 |
| 882,882 | Hanzel | Mar. 24, 1908 |
| 1,148,140 | Bidwell | July 27, 1915 |
| 1,444,390 | Rohrbach | Feb. 6, 1923 |
| 2,137,235 | Carothers | Nov. 22, 1938 |
| 2,212,772 | Graves | Aug. 27, 1940 |
| 2,231,949 | Rinehart | Feb. 18, 1941 |
| 2,402,853 | Sweeney | June 25, 1946 |
| 2,449,700 | Hubbard | Sept. 21, 1948 |